(12) United States Patent
Tirat

(10) Patent No.: US 10,313,233 B2
(45) Date of Patent: Jun. 4, 2019

(54) METHOD FOR ROUTING DATA, COMPUTER PROGRAM, NETWORK CONTROLLER AND NETWORK ASSOCIATED THEREWITH

(71) Applicant: BYO Networks, Orsay (FR)

(72) Inventor: Olivier Tirat, Orsay (FR)

(73) Assignee: BYO NETWORKS, Orsay (FR)

( * ) Notice: Subject to any disclaimer, the term of this patent is extended or adjusted under 35 U.S.C. 154(b) by 119 days.

(21) Appl. No.: 14/765,681

(22) PCT Filed: Feb. 3, 2014

(86) PCT No.: PCT/EP2014/052064
§ 371 (c)(1),
(2) Date: Aug. 4, 2015

(87) PCT Pub. No.: WO2014/122099
PCT Pub. Date: Aug. 14, 2014

(65) Prior Publication Data
US 2015/0372906 A1    Dec. 24, 2015

(30) Foreign Application Priority Data
Feb. 5, 2013   (FR) ...................................... 13 50974

(51) Int. Cl.
*H04L 12/721*     (2013.01)
*H04L 12/717*     (2013.01)
*H04L 12/751*     (2013.01)

(52) U.S. Cl.
CPC .............. *H04L 45/44* (2013.01); *H04L 45/02* (2013.01); *H04L 45/42* (2013.01)

(58) Field of Classification Search
None
See application file for complete search history.

(56) References Cited

U.S. PATENT DOCUMENTS

| | | | | |
|---|---|---|---|---|
| 9,178,807 | B1 * | 11/2015 | Chua | H04L 45/02 |
| 2012/0147898 | A1 | 6/2012 | Koponen et al. | |
| 2013/0051399 | A1 * | 2/2013 | Zhang | H04L 47/12 370/401 |
| 2013/0058250 | A1 * | 3/2013 | Casado | H04L 12/4633 370/254 |
| 2013/0132536 | A1 * | 5/2013 | Zhang | H04L 41/0823 709/221 |

* cited by examiner

*Primary Examiner* — Saumit Shah
(74) *Attorney, Agent, or Firm* — Troutman Sanders LLP

(57) ABSTRACT

A method for routing data in a computer network (1) including machines (2), routers (3) and controllers (4) defining routing rules and transmitting them to routers, comprising:
storing by a controller in its database, of an identifier of a machine matched with an associated parameter including an identifier of the network segment associated with said machine and/or an identifier of a controller, for which the respective portion of the network which is associated with it, comprises said machine;
transmitting by said controller to another controller of said set of information, and storing by said other network controller in its database, said set of information.

19 Claims, 1 Drawing Sheet

METHOD FOR ROUTING DATA, COMPUTER PROGRAM, NETWORK CONTROLLER AND NETWORK ASSOCIATED THEREWITH

The present application is the U.S. National Phase of International Patent Application Ser. No. PCT/EP2014/052064, filed Feb. 3, 2014, which claims priority to French Patent Application Ser. No. 1350974, filed Feb. 5, 2013. The contents of the forgoing applications are hereby incorporated by reference in their entireties.

The present invention relates to the field of routing in computer networks.

More specifically, the invention relates to a method for routing data in a computer network cut out into network segments. The computer network includes machines, a set of pieces of equipment for interconnecting machines and a set of network controllers each including a database and each associated with at least one respective portion of the network. Each controller defines rules including at least routing rules for said associated respective portion of the network, and transmits said rules to the pieces of interconnection equipment of said respective associated portion of the network. And a piece of interconnection equipment is adapted for routing, in the network, according to said rules which have been transmitted to it, exchanged data between two machines.

In conventional IP data networks, the routing is ensured by pieces of interconnection equipment of the type: switches and routers. The switches have the function of interconnecting machines belonging to a same network segment, i.e. routing the exchanged data between these machines, while the routers have the function of routing the exchanged data from a network segment to another network segment. As the logical and physical structures of these networks are very related to each other, knowledge of the topology of the physical network is indispensable for applying the routing of the network. The routers in these IP networks maintain correspondence tables, called routing tables, indicating the logical path, i.e. for example an IP address of the next addressee, in order to in fine allow transmission of the data towards the final addressee, for example localized by its IP address. These routing tables in a router are elaborated and maintained by internal processes to the router. They ray include static and/or dynamic portions.

Several drawbacks result from this implementation of routing. Indeed, the information on the topology of the network is partly and disparately maintained in the switches and routers using this information. Further, a modification of the topology of the network may involve the change of several configurations of these pieces of equipment, which should be achieved simultaneously in order to achieve the required interconnections.

Recently, the logically configured network architecture, called SDN ("Software-Defined Networking") has appeared. According to this architecture, the control level, i.e. the elaboration of the routing rules, is decoupled from the data level, i.e. from the application of these routing rules to the data. With the SDN architecture, it is notably possible to easily apply virtual elements of the network, associated with a certain number of characteristics and functionalities and which is based on physical elements which may be transparently changed with regard to the use of the virtual element. The data of the network are conveyed by pieces of interconnection equipment according to routing rules produced by network controllers, and then transmitted to the pieces of interconnection equipment. These routing rules defined by the controller give the possibility of interconnecting the virtual or physical machines with each other, without however having to identify their physical position in the network, or their physical connection to the pieces of interconnection equipment of the network. They also determine the paths followed by the data at the outlet of each piece of interconnection equipment of the logically configured network. In order to elaborate these rules, the network controllers include a database, with a static or dynamic nature, describing the network, according to which the controllers define the routing rules.

The present invention is directed to proposing a solution contributing to the solution of the drawbacks mentioned above, and which notably finds application in networks implementing the SDN architecture.

For this purpose, according to a first aspect, the invention proposes a method for routing data in a computer network of the aforementioned type, characterized in that it comprises the following steps:

a step for storing with a network controller in its database, a set of pieces of information comprising an identifier of a machine matching an associated parameter, said associated parameter including an identifier of the network segment associated with said machine and/or an identifier of a controller for which the respective portion of the network which is associated with it comprises said machine;

a step for transmitting through said network controller to another network controller said set of information, and a step for storage, by said other network controller, in its database, of said set of information.

With such a method, it is possible to elaborate and maintain at the network controllers a centralized set of data describing at any instant the condition of the network. The method according to the invention further allows a reduction in the volume of data required for transmission between controllers of a same network.

In embodiments, the method for routing data in a computer network according to the invention further includes one or several of the following characteristics:

said identifier of the machine is a physical address of said machine;

said rules including at least routing rules are defined by a network controller depending on at least the identifier of the machine and on said associated parameter stored correspondingly in its database;

said rules including at least routing rules are defined by a network controller depending on at least the identifier of the machine and on said associated parameter stored correspondingly in its database;

the identified controller is a controller transmitting routing rules to the piece of interconnection equipment to which said machine is directly connected:

the set of pieces of information comprises the identifier of the machine matching the associated parameter and at least one of the elements from:

at least one IP address identifying said machine for at least one of the pieces of interconnection equipment;

an indication of validity of said set of information;

an indication of a mechanism for authenticating said set of information;

an address of a network controller having initially defined the match between the identifier of the machine and the associated parameter in the set of information;

a virtual segment identifier of the VLAN or VxLAN tag type;

at least one IP address of at least one piece of interconnection equipment located in the portion of the network respectively associated with the network controller having initially defined the match between the identifier of the machine and the associated parameter in the set of information;

pieces of information for geo-localization of said machine 2A and/or of said controller, said method includes an updating step, between said network controller and a second network controller, for sets of information stored in their respective database and each comprising an identifier of a machine matching said associated parameter;

said updating step includes a mechanism for synchronizing said databases with each other.

According to a second aspect, the present invention proposes a computer program for routing data in a computer network cut out into network segments and including machines, a set of pieces of interconnection equipment of the machines and a set of controllers each including a database and each associated with at least one respective portion of the network, each controller defining rules including at least routing rules for said respective associated portion of the network, and transmitting said rules to the pieces of interconnection equipment of said respective associated portion of the network, a piece of interconnection equipment being adapted for routing, in the network, according to said rules which have been transmitted to it, exchanged data between two machines, said program including instructions for applying the steps of the method according to the preceding claims during execution of the program by processing means of the network controller.

According to a third aspect, the present invention proposes a network controller in a computer network including a database and adapted for defining rules including at least routing rules for a portion of the network which is respectively associated with it, and adapted for transmitting said rules to pieces of interconnection equipment of said respective associated portion of the network which are adapted for routing in the network, according to said rules which have been transmitted to it, exchanged data between two machines, said network controller being intended for a computer network cut out into network segments, including machines, a set of pieces of interconnection equipment of the machines and a set of controllers each including a database and each associated with at least one respective portion of the network, each controller defining rules including at least routing rules for said respective associated portion of the network, and transmitting said rules to the pieces of interconnection equipment of said respective associated portion of the network, said network controller being characterized in that it is adapted for storing in its database, a set of pieces of information comprising an identifier of a machine matching an associated parameter, said associated parameter including an identifier of the network segment associated with said machine and/or an identifier of a controller for which the respective portion of the network which is associated with it, comprises said machine; and in that said network controller is adapted for transmitting to another network controller said set of information with view to storage, by said other network controller, in its database, of said set of information.

According to a fourth aspect, the present invention proposes a computer network cut out into network segments, said computer network including machines, a set of pieces of interconnection equipment of the machines, a set of controllers each including a database and each associated with at least one respective portion of the network, each controller defining rules including at least routing rules for said respective associated portion of the network, and transmitting said rules to pieces of interconnection equipment of said respective associated portion of the network, wherein a piece of interconnection equipment is adapted for routing, in the network, according to said rules which have been transmitted to it, exchanged data between two machines, said network being characterized in that the network controllers are network controllers according to the third aspect of the invention, each of said controllers being further adapted for storing in its database, a set of pieces of information which is transmitted to them by another network controller, said set of pieces of information comprising an identifier of a machine matching an associated parameter including an identifier of the network segment associated with said machine and/or an identifier of a controller, for which the respective portion of the network which is associated with it, comprises said machine.

These characteristics and advantages of the invention will become apparent upon reading the description which follows, only given as an example, and made with reference to the appended drawings, wherein:

FIG. 1 represents a SDN computer network 1 in an embodiment of the invention.

Figure 1:
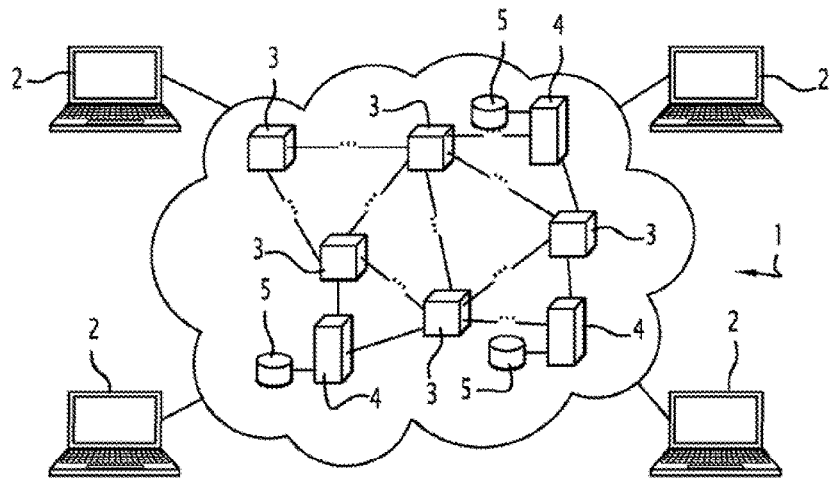
FIG. 1 represents a computer network in an embodiment of the invention.

The computer network 1 comprises several network elements, only one portion of which is illustrated in FIG. 1: a plurality of machines 2, pieces of interconnection equipment 3, called hereafter routers 3, and network controllers 4, as well as telecommunication links (cables, radio links) connecting certain of these elements directly with each other so as to form a meshing of the network 1 allowing the establishment of a relationship between the machines 2, via the routers 3, under the control of the network controllers 4.

Each element of the network is identified by a machine identifier which may be a physical identifier or physical address, corresponding to level 2 of the OSI standard ("Open Systems Interconnection"). Such a machine identifier is for example stored in a network card of the element and is permanently set during the whole lifetime of the element, even when it is displaced.

Each element of the network is further identified by a network identifier, for example an IP address, corresponding to level 3 of the OSI standard.

The machines 2 are for example PCs, servers etc., located at the ends of the network 1. Each machine 2 is adapted for transmitting data intended for another machine and/or for receiving data from another machine 2. Unlike the other elements of the network, the machines 2 are characterized by the fact that they do not need to receive rules from the controllers 4 in order to communicate with the other machines 2 of the network.

Each machine 2 of the network is directly connected to a router 3 through a communication link. This router will be called below a «router for connecting the machine 2».

Each network controller 4 is associated with a database 5. It is adapted for controlling router(s) 3 which is(are) respectively associated with it and thus controlling the data flow passing through these routers 3. Each controller 4 is thus associated with a respective portion of the network comprising the routers thus controlled by it and the machines which are directly connected to these routers. A network controller 4 is thus adapted for defining rules, notably routing rules, intended for these routers 3, according to data stored in its database 5 notably relating to machines 2 and for transmitting the rules, comprising the defined routing rules to the routers 3 which it controls, these routers storing these routing rules. It is further adapted for carrying out for example operations for counting given events occurring at the controlled routers etc.

The computer network 1 is distributed in a plurality of network segments.

A network segment is defined as being a set of machines 2 of the network 1 which share among them knowledge of their machine identifier in order to directly communicate with each other, and which, in order to communicate with each other, identify themselves by means of this single machine identifier.

A network segment may be interconnected with another network segment via a router 3.

The network segments are identified by network segment logic identifiers specific to the network 1.

A router 3 is a piece of interconnection equipment: it is adapted for receiving a data packet initially sent by a machine A, towards the final destination of machine B, in order to determine according to the network identifier of machine B, the network identifier of the machine, and optionally other criteria, the routing rule(s) which applies(y), and for applying the routing rules, which indicates the path up to the next network element, which may be a machine 2 or a router 3, to which the data packet should be transmitted.

In an embodiment, the network controller 4 includes a memory and a microprocessor, and the steps described below coming under a network controller are applied by this network controller following execution on the microprocessor, of software instructions of a program stored in memory.

Figure 2:
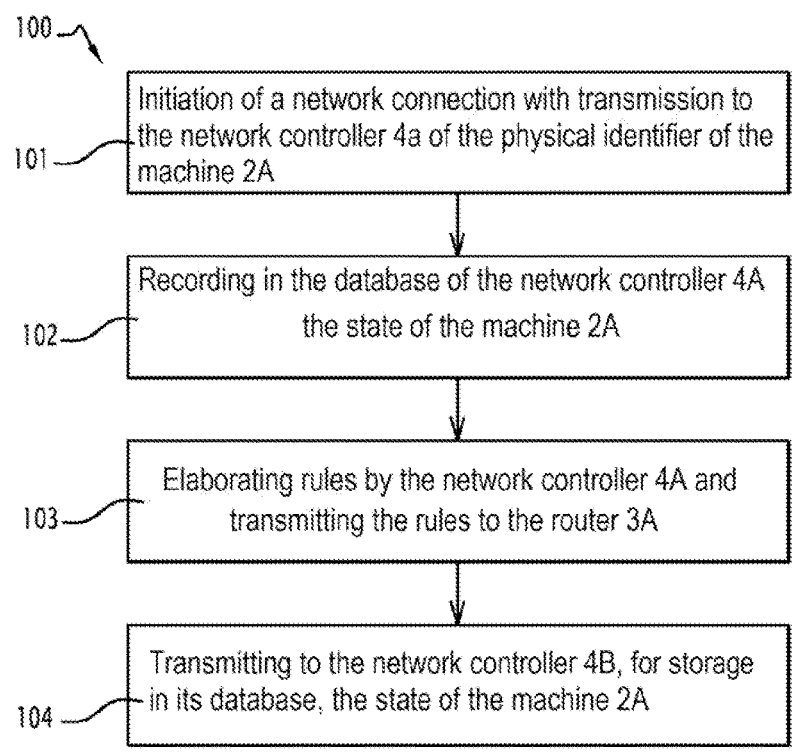
FIG. 2 is a flow chart of the steps of a method in an embodiment of the invention.

In a first embodiment of a method 100 according to the invention, the following steps are applied, with reference to FIG. 2.

It is considered that a machine 2, called 2A hereafter, is connected for the first time to the network 1.

In one step 101, the machine 2A transmits on the network 1 a first connection packet indicating its physical identifier.

A router 3 receives this packet. The router is localized hereafter by the reference 3A. If the router 3A at this stage does not have any rule relating to the packet transmitted by the machine 2A, the router 3A does not transmit this packet to the controller 4 which controls it, called 4A hereafter.

In a step 102, the network controller 4A controlling the router 3A receives this packet indicating the physical identifier of the machine 2A, and then checks whether this physical identifier exists in its database 5, called 5A hereafter.

In the positive case, it associates the physical identifier of the machine 2A to the network segment to which the machine 2A belongs. It records this association in the database 5A.

In the negative case, it applies default association rules between the identifier of the machine 2A and the network segments known to the controller 4A in order to determine a default association between this machine identifier and a network segment. It records in its database 5A this default association. The controller 4A may record in the base 5A a particular association with a particular segment banning any communication with machine 2A in a particular embodiment of the invention.

In an embodiment, this network segment identifier associated with the identifier of the machine 2A is an identifier of the network segment of the router 3A having transmitted the packet to the network controller 4A in step 101, which is the router directly connected to the machine 2A.

This association between the physical identifier of the machine 2A and additional pieces of information comprising at least the identifier of the network segment to which this machine 2A belongs, is designated as <<state>> of the machine 2A.

In the case when these additional pieces of information only comprise the identifier of the network segment, the condition is then called a «minimum state of the segment type of the machine 2A».

In a subsequent operation 103 for elaborating rules, notably routing rules, by the network controller 4A, these rules, notably routing rules, are elaborated depending on the thereby modified contents of the database 5A, and are therefore elaborated depending on this recorded state relating to machine 2A. And then these rules notably taking into account the machine 2A in the routing, are transmitted to the routers 3 controlled by the network controller 4A, including the router 3A.

The routings and processing operations then carded out by these routers 3, are based on these received updated rules, taking into account the machine 2A.

In a step 104, which, in an embodiment, may take place before step 103, the network controller 4A transmits to a network controller 4B, via the network 1 or via any other transmission method, the state of the machine 2A or at least one portion of this state comprising the minimum state of the machine 2A.

The network controller 4B checks whether this state exists in its database 5, called 5B hereafter.

In the positive case, it updates the state of the network for the relevant machine in its database 5B.

In the negative case, it records in its database 5B this thereby received state of the machine 2A. The recording of this state may be conditioned by the verification of certain conditions, notably relating to the identification of the controller 4A, the capability or the authorization of the controller 4A for modifying the base 5B, the existence of the segment identifier on the network 1, relating to the number of machines 2 recorded on the identified network segment, relating to the presence of the machine identifier in a specifically authorized or banned identifier base.

In a subsequent operation for elaborating rules, notably routing rules, by the network controller 4B, these rules, notably routing rules, are elaborated depending on the thereby modified contents of the database 5B, and are therefore elaborated depending on this recorded state relating to machine 2A. And then these rules notably taking into account the machine 2A in the routing, are transmitted to the routers 3 controlled by the network controller 4B.

The routings and processing operations then carried out by these routers 3, are based on these received updated rules, taking into account machine 2A.

In an embodiment, the step 104 for broadcasting the state of the machine 2A is only carried out after occurrence of a logic connection of the machine 2A to the network 1.

In an embodiment, each controller 4 of the network 1 is adapted for carrying out a transmission operation, to at least one other controller 4 of the network 1, for indicating the modifications relating to the states, and which have thus been broadcast to it or which have occurred in its database 5. These modifications for example comprise the addition of new states of machines or the suppression of states of machines.

And this other network controller 4 is adapted for recording in its own database, these modifications which have occurred.

These operations may take place in every period of length T for example or else upon modification of the information contained in the base of the other controllers.

In an embodiment, these updates of the states are applied via mechanisms for synchronizing databases.

This broadcast of modifications dealing with the states of the machines from each network controller 4 intended for at least one other network controller 4 allows gradual updating of the databases of the controllers throughout the network 1.

In an embodiment, each physical identifier of the machine and each identifier of a network segment is unique, at any instant.

In an embodiment, each association between the physical identifier of the machine 2A and the identifier of the network segment is unique in the network, at any instant.

In a second embodiment, in the state of the machine 2A recorded in the database 5A, the network controller 4A records the network identifier of a controller associated with the machine 2A instead of the identifier of the network segment in step 102, the other steps taking place in a similar way by taking into account this thereby defined state.

In an embodiment, the network controller 4A records its network identifier as a network identifier of the controller associated with the machine 2A or records the network identifier of another network controller as a network identifier of the controller associated with the machine 2A.

In an embodiment, the network identifier associated with the machine 2A is that of the controller having the control of the network piece of equipment 3A to which is connected the machine 2A.

In the case when the additional pieces of information exclusively comprise the identifier of the network controller associated with the machine 2A, the state is then called «minimum state of a network controller type of the machine 2A».

In an embodiment, if the controller network 4A receiving in step 101 the message from the router 3A, detects that it is not competent for producing the relative association with the machine 2A, it determines which network controller is a priori competent on the basis, for example, of pieces of configuration information included in the base 5A associating the identifier of the machine 2A with the network identifier of the competent controller. It then transmits to this network controller this packet indicating the machine identifier of the machine 2A.

When this packet reaches a network controller which detects itself as competent, optionally after having passed through several network controllers which are detected as incompetent, this competent network controller produces the association between the physical identifier of the machine 2A and the additional pieces of information mentioned above in step 102 in its database and applies the operations indicated in steps 103-104 as coming under the network controller 4A.

In an embodiment, if the network controller 4A receiving in step 101 the message from the router 3A, detects that it is not competent for producing and recording the relative association with the machine 2A, it determines which network controller is a priori competent on the basis of pieces of information included in the base 5A associating the identifier of the machine 2A with the network identifier of the competent controller. It then transmits to this network controller this packet indicating the physical address of the machine.

In an embodiment, the pieces of information recorded in the state of the machine 2A during the association step 101 further include the physical identifier of the machine 2A, the network segment identifier (and/or of the network identifier of the network controller associated with the machine 2A) associated with the machine 2A in the state of the machine 2A, one or several network identifiers identifying the machine 2A, notably known by router(s) 3 controlled by the network controller 4 associated with the database 5 in which the relevant state relating to the machine 2A is recorded;

an indication of the validity of the association between the physical identifier of the machine 2A and the network segment identifier (or the network identifier of the network controller) produced in the state of the machine 2A, for example a limiting validity date of the association beyond which the association disappears from the base 5A and having an impact on the associated rules;

an identification on the authentication mechanism (for example of the server) having validated the association;

a limiting date of the validity of the association;

a virtual segment identifier of the VLAN or VxLAN tag type;

a network address of the network controller having produced the association;

one or several network identifiers of the routers 3 controlled by the controller 4 having produced the association;

pieces of geo-localization information of the machine 2A or of the controller 3A or of the controller having recorded the association.

In the embodiment considered above, the declaration of the minimum state to the network controller is made at the first connection of the machine 2 to the network 1. In an embodiment, this may be achieved at any moment, for example, upon generating a new network interface on the machine 2A, or else during renewal of the connection.

In the embodiment described above, the association between the physical identifier of a machine and the identifier of the network segment, or the association between the physical identifier of a machine and the identifier of the network controller, is produced by a network controller 4 on the basis of the sending by the machine 2A of a first connection packet. In another embodiment, this association is instead determined by a connection process other than the broadcasting of a first packet. This connection process may contain authentication mechanisms allowing association of an identity with the machine 2A and certifying this identity. The segment identifier may then be associated with the identity certified by the authentication mechanism allowing a dynamic association between the identifier of the machine 2A and the network segment identifier. in a preferential connection method, the client machine and the controller use the EAP protocol for producing this association. Any other connection authentication mechanism may be used for the same purposes. The thereby determined association is then transmitted to a network controller 4, for storage by the latter in its database 5, and then for broadcasting to other network controllers 4.

In an embodiment, one or several network controllers 4 delegate to another specific network controller 4, the elaboration of all or part of the routing rules relative to the routers which it(they) control(s) and to which they finally send the rules totally or partly elaborated by the specific network controller. In such a case, the state of the machines 2 associated with these network controllers delegating the rules is broadcast to the specific network controller.

In an embodiment, when the states of a database 5 of a network controller are modified, the latter elaborates and transmits new rules for the routers either entirely, or in a differential way relatively to the elaborated rules and/or transmitted earlier by this network controller 4.

Thus, a method gives the possibility of elaborating and of maintaining at the network controllers a centralized set of data describing the state of the network at any instant.

The method according to the invention further allows reduction in the volume of required data to be transmitted between controllers of a same network by replacing with the transmission of the states, the transmission of the rules by the pieces of equipment.

The present invention was described above with reference to a SDN computer network. Nevertheless, it may be applied to any type of network.

The invention claimed is:

1. A method for routing data in a computer network cut out into logic network segments, comprising the following steps:
    providing a computer network including machines, each machine being identified by a machine identifier and belonging to a logic network segment within which the machines belonging to said logic network segment communicate directly with each other through the shared knowledge of their machine identifiers, the computer network further including a set of pieces of interconnection equipment for interconnecting the machines, and a set of network controllers each associated with a database and with at least one respective portion of the network;
    storing, by a network controller, in its database, of a set of pieces of information comprising the machine identifier of a machine matching an associated parameter, said associated parameter including an identifier of the logic network segment to which said machine belongs;
    defining, by the network controller, according to data stored in its database, including the set of pieces of information, rules including at least routing rules for said respective portion of the network with which the network controller is associated, said routing rules being adapted so that machines belonging to a same logic network segment communicate directly with each other through the shared knowledge of their machine identifiers,
    transmitting, by the network controller, said rules to the pieces of interconnection equipment comprised in the at least one respective portion of the network with which the network controller is associated,
    routing in the network, by at least one of said pieces of interconnection equipment, exchange data between two machines according to the rules which have been transmitted to said piece of interconnection equipment,
    transmitting with the network controller to another network controller said set of pieces of information, and storing with said other network controller, in its database, said set of pieces of information, wherein the identifier of the logic network segment which is stored in the database of the network controller is constituted by a unique identifier of the logic network segment.

2. The method for routing data according to claim 1, according to which said identifier of the machine is a physical address of said machine.

3. The method for routing data according to claim 1, according to which said rules including at least routing rules are defined by the network controller according to at least the identifier of the machine and to said associated parameter correspondingly stored in its database.

4. The method for routing data according to claim 1, according to which the identified controller is a controller transmitting routing rules to the piece of interconnection equipment to which said machine is directly connected.

5. The method for routing data according to claim 1, according to which the set of pieces of information comprises the identifier of the machine matched with the associated parameter and at least one of the elements from:
    at least one IP address identifying said machine for at least one of the pieces of interconnection equipment;
    the indication of validity of said set of pieces of information;
    the indication of a mechanism for authentication of said set of pieces of information;
    at least one IP address of at least one piece of interconnection equipment located in the portion of the network respectively associated with the network controller having initially defined the match between the identifier of the machine and the associated parameter in the set of pieces of information;
    geo-localization information of at least one of said machine and said network controller.

6. The method for routing data according to claim 1, including a step, between said network controller and a second network controller updating the sets of pieces of information stored in their respective database and each comprising an identifier of a machine matching said associated parameter.

7. The method for routing data according to claim 6, according to which said updating step includes a mechanism for synchronizing said databases with each other.

8. The method for routing data according to claim 1, wherein the computer network consists of a SDN computer network.

9. The method for routing data according to claim 1, wherein the set of pieces of information comprises the identifier of the machine matched with the associated parameter and a virtual segment identifier of the VLAN or VxLAN tag type.

10. The method for routing data according to claim 1, comprising a step of a first machine of the network identifying itself with a second machine of the network belonging to the same logic network segment as the first machine, wherein said identifying step is performed by means of the single machine identifier of the first machine.

11. The method for routing data according to claim 1, comprising the further additional steps:
    transmission, by an emitting machine of the computer network, on the computer network, of the machine identifier of said emitting machine,
    reception, by a receiving piece of interconnection equipment of the computer network, of the machine identifier of said emitting machine,
    transmission of the machine identifier of said emitting machine to the network controller which controls said receiving piece of interconnection equipment, and
    storage, in the database, of the machine identifier of said emitting machine and of the network segment identifier of the network segment to which said emitting machine belongs, in a manner that the network segment identifier is associated to the machine identifier of said emitting machine in the database.

12. The method for routing data according to claim 11, comprising, prior to the storage step, a step of determination of the network segment to which said emitting machine belongs, during which the network segment to which the receiving piece of interconnection equipment belongs is determined as constituting the network segment to which said emitting machine belongs.

13. The method for routing data according to claim 1, wherein each association between a machine identifier of a machine and the identifier of the logic network segment to which said machine belongs is unique.

14. The method for routing data according to claim 1, wherein the associated parameter includes an identifier of an identified controller associated with a portion of the network which comprises said machine.

15. The method for routing data according to claim 14, wherein the identifier of an identified controller associated with the machine identifier of a machine consists of the identifier of the controller which controls a piece of interconnection equipment to which the machine is connected.

16. The method for routing data according to claim 1, wherein the set of pieces of information comprises the identifier of the machine matched with the associated parameter and an address of a network controller having initially defined correspondence between the identifier of the machine and the associated parameter in the set of pieces of information.

17. A network controller comprising a database and adapted for defining rules including at least routing rules for a respective portion of the network with which the network controller is associated, and adapted for transmitting said rules to pieces of interconnection equipment of said respective portion of the network which are adapted for routing, in the network, depending on said rules which have been transmitted to it, exchanged data between two machines,
wherein said network controller is intended for a computer network cut out into logic network segments, including machines, each machine being identified by a machine identifier and belonging to a logic network segment within which the machines belonging to said logic network segment communicate directly with each other through the shared knowledge of their machine identifiers, a set of pieces of interconnection equipment for interconnecting the machines and a set of controllers each including a database and each associated with at least one respective portion of the network,
wherein each controller defines, according to data stored in its database, including the set of pieces of information, rules including at least routing rules for its respective portion of the network, said routing rules being adapted so that machines belonging to a same logic network segment communicate directly with each other through the shared knowledge of their machine identifiers,
wherein each controller transmits said rules to the pieces of interconnection equipment of said respective portion of the network,
wherein said network controller is adapted for storing in its database, a set of pieces of information comprising an identifier of a machine matched with an associated parameter, said associated parameter including an identifier of the logic network segment to which said machine belongs and/or an identifier of an identified controller associated with a portion of the network which comprises said machine; and
wherein said network controller is adapted for transmitting to another network controller said set of pieces of information with view to storage, by said other network controller, in its database of said set of pieces of information,
wherein the identifier of the logic network segment which is stored in the database of the network controller is constituted by a unique identifier of the logic network segment.

18. A computer network cut out into logic network segments, said computer network comprising:
machines, each being identified by a machine identifier and belonging to a logic network segment within which the machines belonging to said logic network segment communicate directly with each other through the shared knowledge of their machine identifiers, a set of pieces of interconnection equipment of the machines,
a set of controllers each comprising a database and each associated with at least one respective portion of the network, each controller defining rules including at least routing rules for its respective portion of the network, and transmitting said rules to the pieces of interconnection equipment of said respective portion of the network,
wherein a piece of interconnection equipment is adapted for routing, in the network, according to said rules which have been transmitted to it, exchanged data between two machines, said network being characterized in that the network controllers are network controllers according to claim 17,
wherein each of said controllers is further adapted so as to store in its database a set of pieces of information which is transmitted to it by another network controller, said set of pieces of information comprising an identifier of a machine matched with an associated parameter including an identifier of the logic network segment to which said machine belongs and/or an identifier of an identified controller associated with a portion of the network which comprises said machine.

19. A method for routing data in a computer network cut out into logic network segments, comprising the following steps:
providing a computer network including machines, each machine being identified by a machine identifier and belonging to a logic network segment within which the machines belonging to said logic network segment communicate directly with each other through the shared knowledge of their machine identifiers, the computer network further including a set of pieces of interconnection equipment for interconnecting the machines, and a set of network controllers each including a database and each associated with at least one respective portion of the network;
storing, by a network controller, in its database, of a set of pieces of information comprising the machine identifier of a machine matching an associated parameter, said associated parameter including an identifier of an identified controller associated with a portion of the network which comprises said machine;
defining, by the network controller, rules including at least routing rules for said respective portion of the network with which the network controller is associated,
transmitting, by the network controller, said rules to the pieces of interconnection equipment comprised in the at least one respective portion of the network with which the network controller is associated, routing in the network, by at least one of said pieces of interconnection equipment, exchange data between two machines according to the rules which have been transmitted to said piece of interconnection equipment, transmitting with the network controller to another network controller said set of pieces of information, and storing with said other network controller, in its database, said set of pieces of information.

* * * * *